US010188976B2

United States Patent
Cho et al.

(10) Patent No.: US 10,188,976 B2
(45) Date of Patent: Jan. 29, 2019

(54) AIR PURIFIER, METHOD FOR DETERMINING TIME TO REPLACE FILTER THEREOF, AND DEVICE AND METHOD FOR DETERMINING FILTER REPLACEMENT TIME PRESSURE DIFFERENTIAL THEREFOR

(71) Applicant: COWAY CO., LTD, Chungcheongnam-do (KR)

(72) Inventors: Young-Gun Cho, Seoul (KR); Ju-Hyun Baek, Seoul (KR); In-Seok Seo, Seoul (KR); Seong-Jin Yun, Seoul (KR); Chul-Soon Dan, Seoul (KR); Sang-Woo Kang, Seoul (KR); Jong-Wan Kim, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 169 days.

(21) Appl. No.: 15/314,530

(22) PCT Filed: Dec. 15, 2014

(86) PCT No.: PCT/KR2014/012306
§ 371 (c)(1),
(2) Date: Nov. 29, 2016

(87) PCT Pub. No.: WO2015/186879
PCT Pub. Date: Dec. 10, 2015

(65) Prior Publication Data
US 2017/0189846 A1 Jul. 6, 2017

(30) Foreign Application Priority Data

Jun. 3, 2014 (KR) .................. 10-2014-0067454
Jul. 30, 2014 (KR) .................. 10-2014-0097227
(Continued)

(51) Int. Cl.
*B01D 46/44* (2006.01)
*B01D 46/24* (2006.01)
(Continued)

(52) U.S. Cl.
CPC ....... *B01D 46/446* (2013.01); *B01D 46/0086* (2013.01); *B01D 46/2403* (2013.01);
(Continued)

(58) Field of Classification Search
CPC ...... B01D 46/42; B01D 46/46; B01D 46/444; B01D 46/446; B01D 46/2403; G06F 17/00
(Continued)

(56) References Cited

U.S. PATENT DOCUMENTS 5,711,785 A * 1/1998 Maxwell ............. B01D 46/002
55/283
6,660,070 B2 * 12/2003 Chung ................. B01D 46/008
96/424
(Continued)

FOREIGN PATENT DOCUMENTS

CN 1235060 11/1999
CN 1279119 1/2001
(Continued)

OTHER PUBLICATIONS

International Search Report PCT/KR2014/012306, dated Mar. 13, 2015 (4 pages).

*Primary Examiner* — Duane Smith
*Assistant Examiner* — Minh Chau T Pham
(74) *Attorney, Agent, or Firm* — Dority & Manning, P.A.

(57) ABSTRACT

An air purifier according to the present disclosure includes: a memory for storing a flow rate/pressure differential correlation graph with regard to each filter utilization state; a pressure differential sensor for measuring a pressure differ-
(Continued)

ential, which is a difference in pressure between the front and rear ends of the filter; and a filter replacement time management unit for determining the time to replace the filter according to a result of matching a pressure differential of the filter, which is measured by the pressure differential sensor at a preset cycle, and the flow rate of air flowing into the filter during pressure differential measurement with the flow rate/pressure differential correlation graph for each utilization state.

8 Claims, 5 Drawing Sheets

(30) Foreign Application Priority Data

Jul. 31, 2014 (KR) .................. 10-2014-0098365
Dec. 11, 2014 (KR) .................. 10-2014-0178074

(51) Int. Cl.
*G06F 17/00* (2006.01)
*B01D 46/00* (2006.01)
*B01D 46/42* (2006.01)

(52) U.S. Cl.
CPC ........... *B01D 46/444* (2013.01); *G06F 17/00* (2013.01); *B01D 46/42* (2013.01)

(58) Field of Classification Search
USPC ...... 55/385.2, 472, 473, DIG. 34; 95/25, 26; 96/424, 397, 417, 421, 422
See application file for complete search history.

(56) References Cited

U.S. PATENT DOCUMENTS

| | | | |
|---|---|---|---|
| 7,749,314 B2 * | 7/2010 | Kondou | B01D 46/0086 55/282.3 |
| 8,182,579 B2 | 5/2012 | Woo et al. | |
| 8,328,905 B2 * | 12/2012 | Matsuzaki | B01D 46/0086 55/471 |
| 2012/0318137 A1 * | 12/2012 | Ragland | B01D 46/42 95/25 |
| 2013/0197829 A1 | 8/2013 | Sherman et al. | |

FOREIGN PATENT DOCUMENTS

| | | |
|---|---|---|
| CN | 1132656 | 12/2003 |
| CN | 1570755 | 1/2005 |
| CN | 101618286 | 1/2010 |
| CN | 101915675 | 12/2010 |
| CN | 101618286 | 5/2012 |
| JP | 5987014 | 5/1984 |
| JP | H01225847 | 9/1989 |
| JP | 9313852 | 12/1997 |
| JP | 2000018675 | 1/2000 |
| JP | 200285930 | 3/2002 |
| JP | 2009036461 | 2/2009 |
| JP | 2009228992 | 10/2009 |
| KR | 2005-0119823 | 12/2005 |
| KR | 0778575 | 11/2007 |
| KR | 2008-0079149 | 8/2008 |
| KR | 2011-0088244 | 8/2011 |

\* cited by examiner

[FIGURE 1]
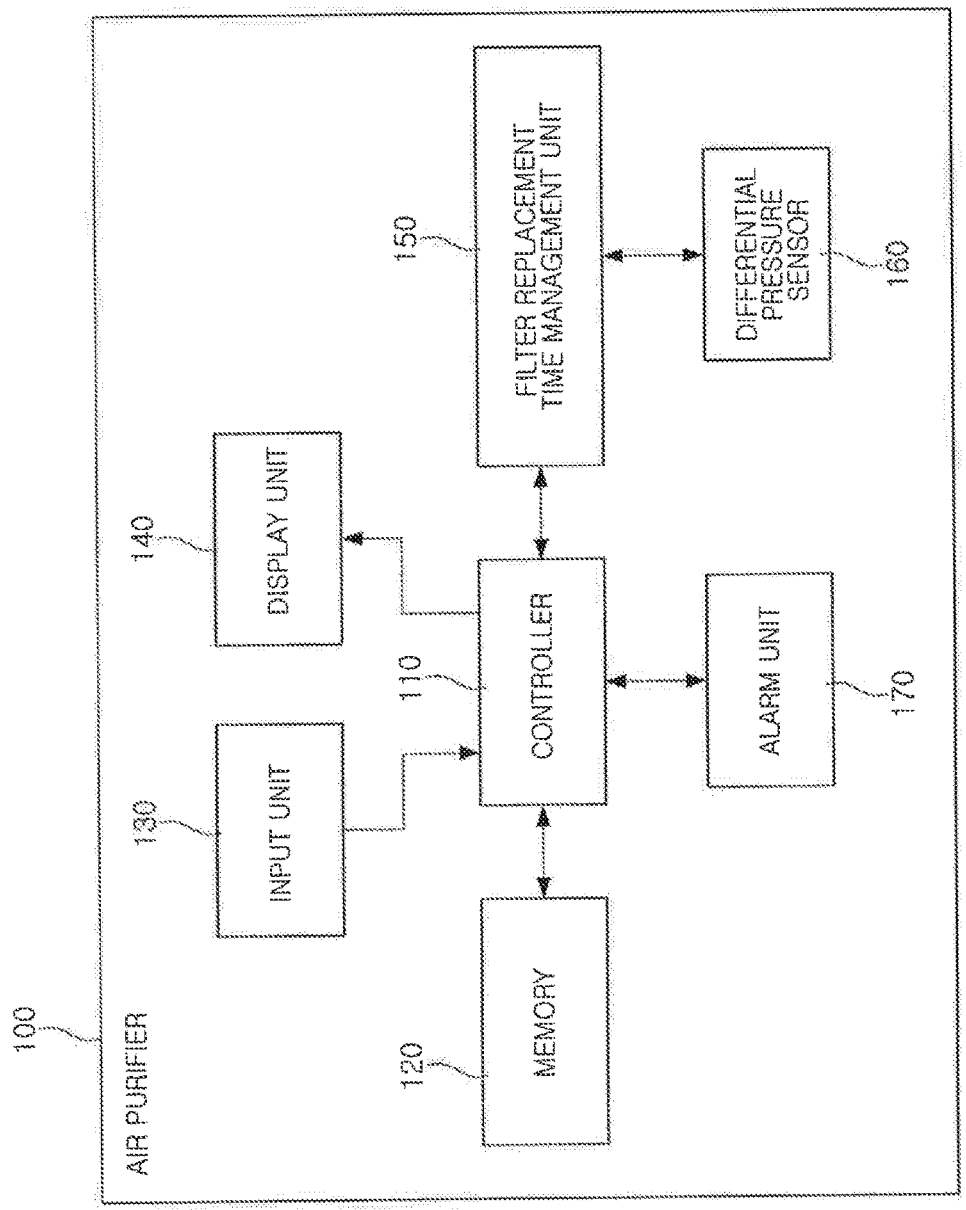

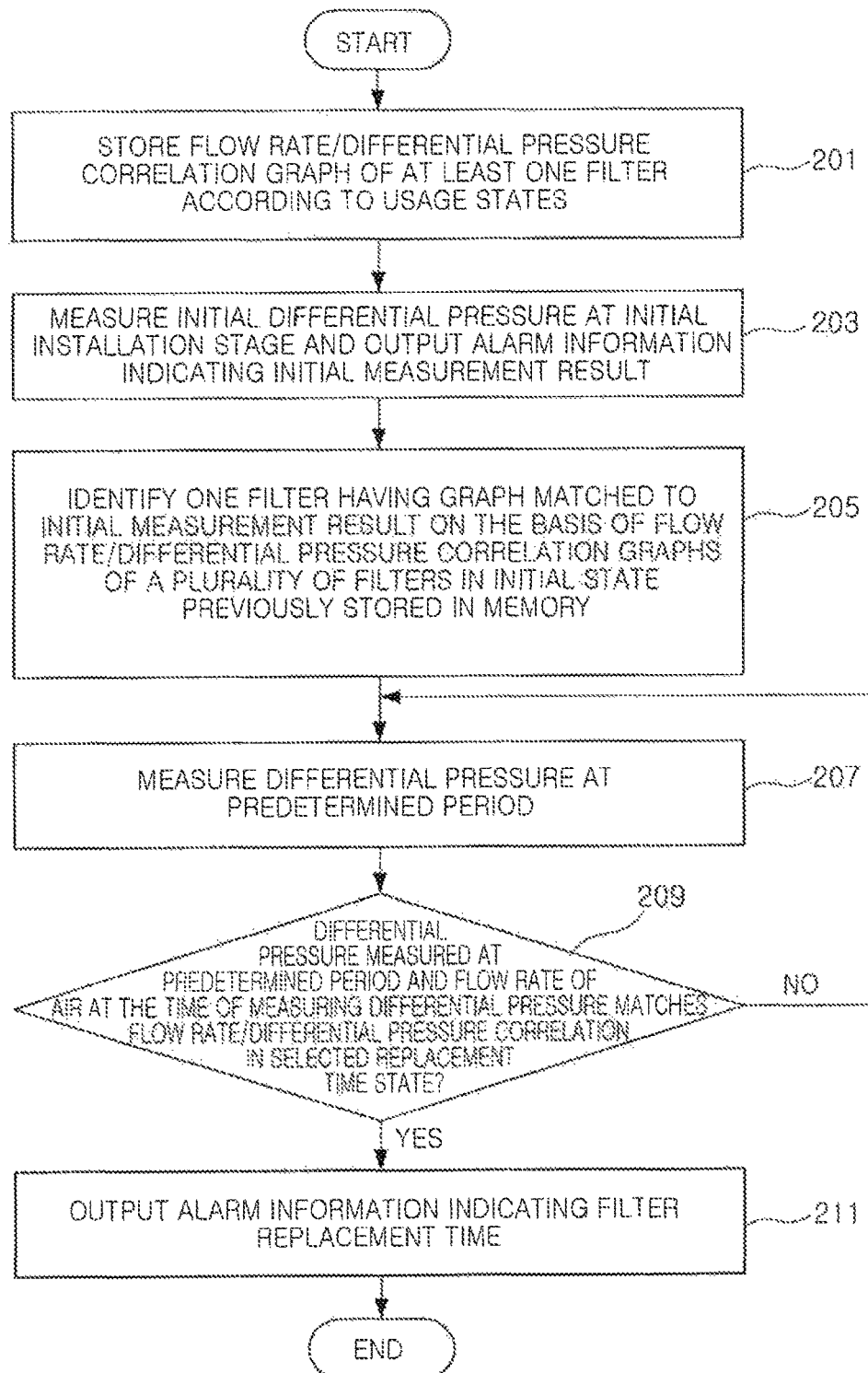
[FIGURE 2]

[FIGURE 3]
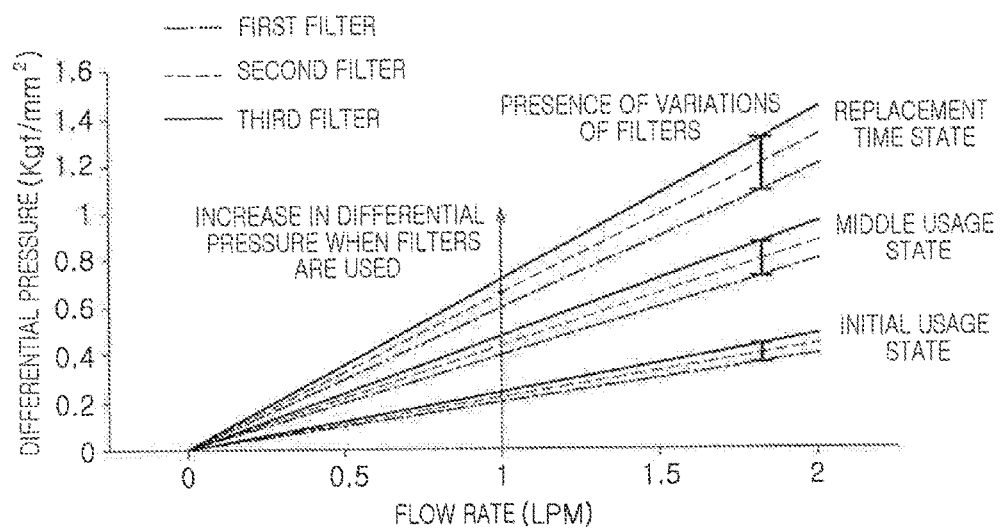

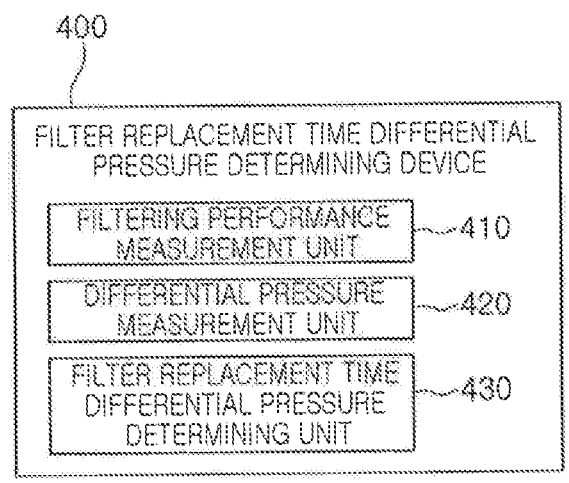
[FIGURE 4]

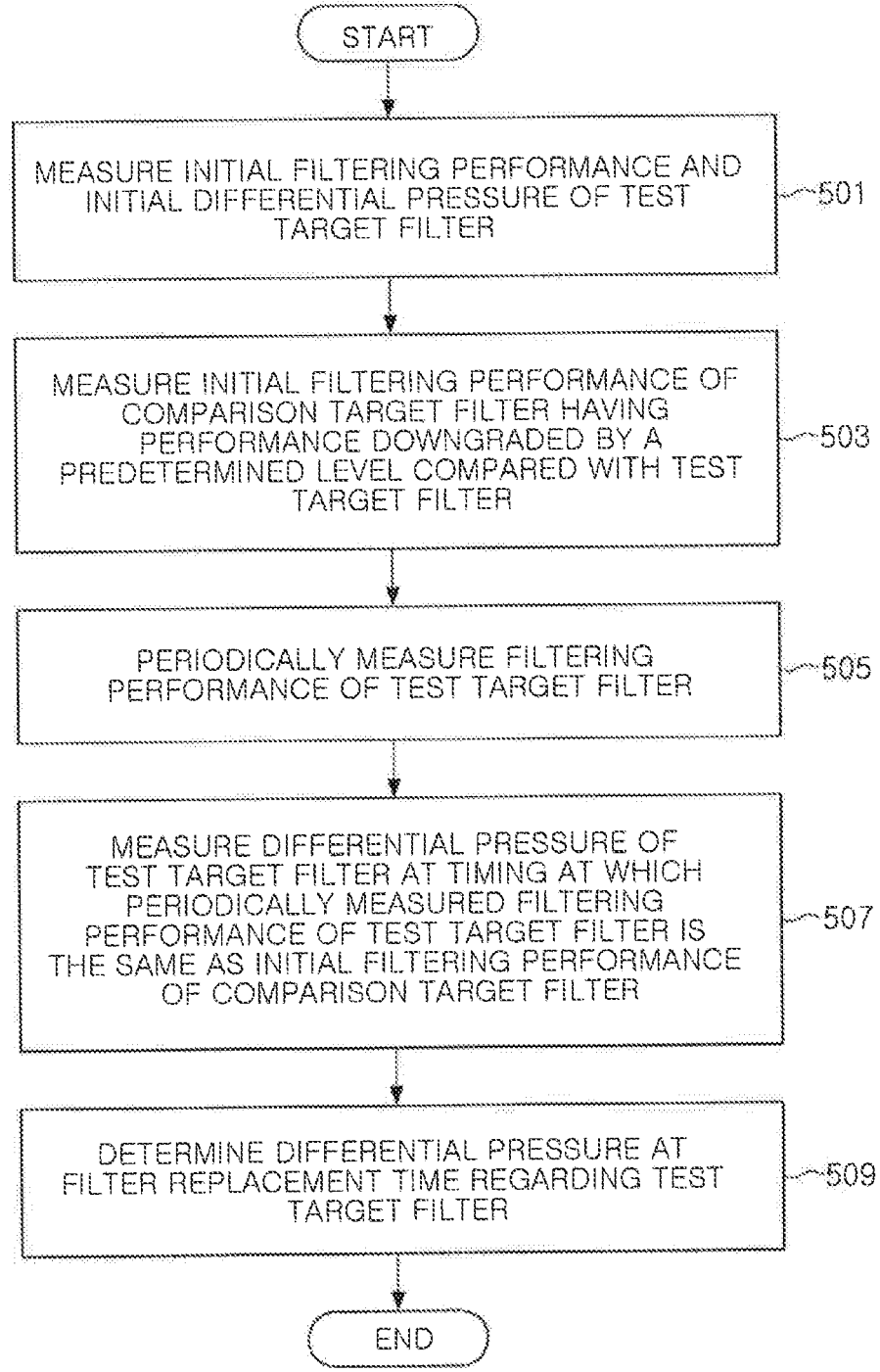
[FIGURE 5]

AIR PURIFIER, METHOD FOR DETERMINING TIME TO REPLACE FILTER THEREOF, AND DEVICE AND METHOD FOR DETERMINING FILTER REPLACEMENT TIME PRESSURE DIFFERENTIAL THEREFOR

CROSS-REFERENCE TO RELATED APPLICATIONS

This application is the U.S. National Stage entry of International Application Number PCT/KR2014/012306 filed under the Patent Cooperation Treaty having a filing date of Dec. 15, 2014, which claims priority to Korean Patent Application Serial Number 10-2014-0067454 having a filing date of Jun. 3, 2014, Korean Patent Application Serial Number 10-2014-0097227 having a filing date of Jul. 30, 2014, Korean Patent Application Serial Number 10-2014-0098365 having a filing date of Jul. 31, 2014 and Korean Patent Application Serial Number 10-2014-0178074 having a filing date of Dec. 11, 2014, the disclosures of all of which are hereby incorporated by reference herein in their entirety for all purposes.

TECHNICAL FIELD

The present disclosure relates to an air purifier, a method for determining a time to replace a filter thereof, and a device and method for determining a filter replacement time differential pressure therefor.

BACKGROUND ART

In general, an air purifier, a device for purifying indoor air contaminated by dust, germs, and the like, through dust collection, sterilization, deodorization, and the like, includes a plurality of filters.

In order to increase efficiency of an air purifier and lengthen a lifespan thereof, filters are required to be periodically managed and replaced. In a related art air purifier, a time to replace a filter is determined depending on an operating time. That is, an operating time is measured, and when an accumulated operating time reaches a preset time, a time to replace a filter notification is displayed to allow a user to replace the filter. Thus, in the related art air purifier, since a filter is replaced depending upon an operating time although a time to replace the filter is varied according to an environment in which the air purifier is installed, it is difficult to replace a filter in a timely manner.

DISCLOSURE

Technical Problem

Therefore, an object of the present invention is to provide a method for determining an accurate time to replace a filter to allow a user to replace a filter for air purification in a timely manner.

Technical Solution

According to an aspect of the present disclosure, an air purifier may include: a memory storing flow rate/differential pressure correlation graphs according to respective filter usage states; a differential pressure sensor measuring differential pressure as a pressure difference between a front end of the filter and a rear end of the filter; and a filter replacement time management unit determining a time to replace the filter according to a result of matching a differential pressure of the filter measured by a differential pressure sensor in every preset period and a flow rate of air introduced to the filter at the time of measuring the differential pressure to the flow rate/differential pressure correlation graph according to each usage state.

According to another aspect of the present disclosure, a method for determining a time to replace a filter of an air purifier may include: storing a flow rate/differential pressure correlation graph according to respective filter usage states; measuring differential pressure of the filter in every preset period; and determining a time to replace the filter according to a result of matching a differential pressure of the filter measured in every preset period and a flow rate of air introduced to the filter at the time of measuring the differential pressure to the flow rate/differential pressure correlation graph according to each usage state.

According to another aspect of the present disclosure, a device for determining filter replacement time differential pressure may include: a filtering performance measurement unit measuring filtering performance of a test target filter in every preset period; a differential pressure measurement unit measuring differential pressure of a replacement time state of the test target filter at a timing at which filtering performance of the test target filter measured in every preset period is the same as initial filtering performance of a comparison target filter having performance downgraded more than the test target filter by a predetermined level; and a differential pressure determining unit determining a differential pressure of a filter replacement time regarding the test target filter on the basis of the differential pressure of the replacement time state.

According to another aspect of the present disclosure, a method for determining filter replacement time differential pressure may include: measuring filtering performance of a test target filter in every preset period; measuring differential pressure of a replacement time state of the test target filter at a timing at which filtering performance of the test target filter measured in every preset period is the same as initial filtering performance of a comparison target filter having performance downgraded more than the test target filter by a predetermined level; and determining a differential pressure of a filter replacement time regarding the test target filter on the basis of the differential pressure of the replacement time state.

The foregoing technical solutions do not fully enumerate all of the features of the present invention. The foregoing and other objects, features, aspects and advantages of the present invention will become more apparent from the following detailed description of the present invention when taken in conjunction with the accompanying drawings.

Advantageous Effects

According to embodiments of the present invention, since a time to replace a filter is determined on the basis of a correlation between a flow rate and differential pressure according to a usage state of the filter, an accurate time to replace the filter may be determined, and since an alarm is output to allow a user to recognize the filter replacement time, the user may timely replace the filter for air purification.

DESCRIPTION OF DRAWINGS

FIG. 1 is a block diagram illustrating a configuration of an air purifier according to an exemplary embodiment of the present disclosure.

FIG. 2 is a flow chart illustrating a method for determining a time to replace a filter of an air purifier according to an exemplary embodiment of the present disclosure.

FIG. 3 is a graph illustrating a correlation between a flow rate and differential pressure previously stored in a memory of an air purifier according to an exemplary embodiment of the present disclosure.

FIG. 4 is a block diagram illustrating a configuration of a device for determining filter replacement time differential pressure for an air purifier according to an exemplary embodiment of the present disclosure.

FIG. 5 is a flow chart illustrating a method for determining filter replacement time differential pressure for an air purifier according to an exemplary embodiment of the present disclosure.

BEST MODE FOR INVENTION

Exemplary embodiments of the present disclosure will now be described in detail with reference to the accompanying drawings. The exemplary embodiments may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity.

FIG. 1 is a block diagram illustrating a configuration of an air purifier according to an exemplary embodiment of the present disclosure.

Referring to FIG. 1, an air purifier 100 according to an exemplary embodiment of the present disclosure includes a controller 110, a memory 120, an input unit 130, a display unit 140, a filter replacement time management unit 150, a differential pressure sensor 160, and an alarm unit 170.

The controller 110 controls a general operation of the air purifier 100, and may be realized by hardware such as a processor, or the like. Also, the controller 110 may be incorporated with the filter replacement time management unit 150 to be described hereinafter.

For example, the controller 110 processes a function of outputting an alarm such that a filter replacement time determined on the basis of differential pressure of a filter measured by the differential pressure sensor 160 may be recognized by a user.

The memory 120 stores a microcode of a program for processing and controlling of the controller 110, various reference data, temporary data created while various programs are being performed, and various updatable data to be kept.

According to an exemplary embodiment, the memory 120 previously stores a flow rate/differential pressure correlation graph of at least one filter according to usage states obtained through experimentation during a manufacturing process.

According to another exemplary embodiment, the memory 120 previously stores a differential pressure at a filter replacement time determined on the basis of a differential pressure at a timing at which performance of a filter is downgraded by a predetermined level. In this case, a differential pressure of the filter is measured in a state in which a flow rate of air introduced to the filter is adjusted to be a preset flow rate. Since the flow rate is fixed, only the differential pressure at the filter replacement time determined on the basis of the differential pressure according to usage states may need to be stored.

The input unit 130 may include a plurality of functional buttons, and provides button input data corresponding to a button input by a user to the controller 110.

Here, functions of the input unit 130 and the display unit 140 may be performed by a touch screen (not shown), and the touch screen (not shown) handles a touch screen input through a user's screen touch and graphic screen output through a touch screen.

The display unit 140 displays state information, limited number of characters, large amounts of video and still images, and the like, generated during an operation of the air purifier. As the display unit 140, a liquid crystal display (LCD) may be used.

The filter replacement time management unit 150 determines a time to replace a filter according to a result of matching a periodically measured differential pressure of the filter and a flow rate of air introduced to the filter when the differential pressure is measured to a flow rate/differential pressure correlation graph according to usage states stored in the memory 120. Here, the flow rate of air introduced to the filter may be a flow rate of air measured when the differential pressure of the filter is measured by an air flow sensor (not shown) installed at a front end of the filter of the air purifier 100 and measuring a flow rate of air introduced to the filter, or may be a flow rate of air previously set according to stages of air volume of the air purifier 100 when the differential pressure of the filter is measured.

According to an exemplary embodiment, in a case in which graphs of flow rate/differential pressure correlation of a plurality of filters according to usage states are stored in the memory 120, the filter replacement time management unit 150 selects one of the plurality of graphs previously stored in the memory 120 on the basis of an initial differential pressure measured at an initial installation stage and a flow rate of air introduced to the filter, and thereafter, the filter replacement time management unit 150 determines a time to replace the filter according to whether periodically measured differential pressure and a flow rate of air introduced to the filter are matched to the selected graph.

In detail, the filter replacement time management unit 150 measures an initial differential pressure through the differential pressure sensor 160 at an initial installation stage, identifies a filter having a graph matched to the measured initial differential pressure and the flow rate of air introduced to the filter when the initial differential pressure is measured, on the basis of the flow rate/differential pressure correlation graphs of a plurality of filters at an initial usage state previously stored in the memory 120, and selects a flow rate/differential pressure correlation graph in a replacement time state of the identified filter.

Thereafter, the filter replacement time management unit 150 may periodically measures a differential pressure of the filter through the differential pressure sensor 160 and determine whether the periodically measured differential pressure and a flow rate of air introduced to the filter at the time of measuring the differential pressure are matched to a flow rate/differential pressure correlation graph of the selected replacement time state.

Here, when the periodically measured differential pressure and a flow rate of air introduced to the filter at the time of measuring the differential pressure are matched to a flow rate/differential pressure correlation graph of the selected replacement time state, the filter replacement time management unit 150 determines that a time to replace the internal filter has arrived and outputs alarm information indicating the filter replacement time through the alarm unit 170. If, however, the periodically measured differential pressure and a flow rate of air introduced to the filter at the time of measuring the differential pressure are not matched to a flow rate/differential pressure correlation graph of the selected replacement time state, the filter replacement time management unit 150 determines that a time to replace the internal filter has not arrived.

In another exemplary embodiment, in a state in which a flow rate of air introduced to the filter is adjusted to a preset flow rate, a differential pressure of the filter may be measured. In this case, the filter replacement time management unit 150 determines a time to replace the filter according to a result of comparison with a differential pressure of the filter replacement time stored in the memory 120 on the basis of the periodically measured differential pressure of the filter and an initial differential pressure.

The differential pressure sensor 160 is installed at both ends (i.e., a front end and a rear end) of the internal filter and measures a differential pressure of the internal filter. Here, the differential pressure refers to a difference of pressure at the front end and at the rear end of the filter. That is, the differential pressure sensor 160 is installed on one surface (front end) of the filter to which unfiltered air is introduced and the other surface (rear end) of the filter from which filtered air is discharged, and measure a differential pressure of the filter by calculating a difference in pressure measured at the front end of the filter and pressure measured at the rear end of the filter through the differential pressure sensor 160.

The alarm unit 170 informs the user about the measurement result regarding the differential pressure, the filter replacement time, and the like. Here, the alarm unit 170 may output an alarm such that the user recognizes the measurement result regarding differential pressure, the filter replacement time, and the like, through human senses such as sight, hearing, and the like.

For example, the alarm unit 170 may output a warning sound or flicker a warning lamp using a buzzer or a light emitting diode (LED), or may display or guide through the display unit 140 to output an alarm indicating the measurement result regarding the differential pressure, the filter replacement time, and the like.

[Mode for Invention]

FIG. 2 is a flow chart illustrating a method for determining a time to replace a filter of an air purifier according to an exemplary embodiment of the present disclosure.

Referring to FIG. 2, the air purifier previously stores a flow rate/differential pressure correlation graph of at least one filter according to usage states in a memory in operation 201. Here, as for the flow rate/differential pressure correlation graph according to usage states, correlation between a flow rate and a differential pressure according to a usage state of a filter is obtained in a state in which air volumes are mechanically set to determined stages (for example, 3 to 5 stage air volume) regarding at least one filter through experimentation in a manufacturing process and schematized as a graph. In this case, a usage state of the filter may include an initial usage state (100% of introduced flow rate is discharged), a middle usage state (90% of a discharge flow rate of the initial usage state is discharged), and a replacement time state (80% of a discharge flow rate of the initial usage state is discharged). An example of the obtained flow rate/differential pressure according to usage states is illustrated in FIG. 3.

According to another exemplary embodiment, a differential pressure of a filter may be measured in a state in which a flow rate of air introduced to the filter is adjusted to a preset flow rate. In this case, the air purifier previously stores a differential pressure at a time to replace filter determined on the basis of the differential pressure of the filter according to usage states in operation 201 in the memory.

Thereafter, in operation 203, in a state of operating at an air volume (for example, 3 stage air volume) previously determined at the initial installation stage, the air purifier may measure an initial differential pressure of the filter and output alarm information indicating an initial measurement result as necessary.

Thereafter, in operation 205, on the basis of the flow rate/differential pressure correlation graphs of a plurality of filters in an initial usage state previously stored in the memory, the air purifier identifies a filter having a graph matched to the initial measurement result, that is, matched to the measured initial differential pressure and a flow rate of air introduced to the filter at the time of measuring the initial differential pressure, and selects a flow rate/differential pressure correlation graph in a replacement time state of the identified filter. The air purifier regards the internal filter as the identified filter.

The operation 205 is performed in a case in which the flow rate/differential pressure correlation graphs of a plurality of filters are stored in the memory, and may be omitted when only the flow rate/differential pressure correlation graph corresponding to the internal filter is stored in the memory.

Thereafter, in operation 207, the air purifier measures a differential pressure of the filter in a state in which the air purifier operates with an air volume of a predetermined stage at a predetermined period. Here, the air purifier may output alarm information indicating a measurement result.

Thereafter, in operation 209, the air purifier determines whether the differential pressure of the filter measured in a state in which the air purifier operates with an air volume of a predetermined stage at the predetermined period and a flow rate of air introduced to the filter at the time of measuring the differential pressure are matched to the selected flow rate/differential pressure correlation graph in the replacement time state. That is, the air purifier determines whether the differential pressure measured at the predetermined period and the flow rate of air are matched to a certain point of the selected flow rate/differential pressure correlation graph of the replacement time state.

When the differential pressure measured at the predetermined period and the flow rate of air are matched to the selected flow rate/differential pressure correlation graph of the replacement time state according to the matching result in operation 209, the air purifier determines that a time to replace the filter has arrived and outputs alarm information indicating the time to replace the filter in operation 211.

If, however, the differential pressure measured at the predetermined period and the flow rate of air are not matched to the selected flow rate/differential pressure correlation graph of the replacement time state according to the matching result in operation 209, the air purifier may determine that a time to replace the filter has not arrived, and returns to the operation 207 and repeatedly performs the following process.

According to another exemplary embodiment, a differential pressure of the filter may be measured in a state in which a flow rate of air introduced to the filter is adjusted to a preset flow rate. In this case, the air purifier determines whether a time to replace the filter has arrived according to a result of comparing with the previously stored differential pressure at the filter replacement time on the basis of the initial differential pressure and the differential pressure of the filter measured at the predetermined period.

Thereafter, the air purifier terminates the algorithm according to an exemplary embodiment of the present disclosure.

Although not shown, when the internal filter is exchanged by the user according to output of the alarm information indicating a time to replace the filter in operation 211, the air purifier may return to operation 203, measure an initial differential pressure with an air volume at the predetermined stage, output alarm information indicating the initial measurement result, and subsequently repeatedly perform the following operations.

FIG. 4 is a block diagram illustrating a configuration of a device for determining filter replacement time differential pressure for an air purifier according to an exemplary embodiment of the present disclosure.

Referring to FIG. 4, a device 400 for determining filter replacement time differential pressure may include a filtering performance measurement unit 410, a differential pressure measurement unit 420, and a filter replacement time differential pressure determining unit 430. The device 400 for determining filter replacement time differential pressure determines a differential pressure of a filter replacement time on the basis of a differential pressure at a time at which filtering performance of a test target filter is downgraded by a predetermined level through experimentation in a manufacturing process, and stores the determined differential pressure in the memory (not shown) provided in the air purifier.

Here, as filtering performance of the filter, performance of removing a foreign object (i.e., dust) having a size of 0.3 defined in international standards (e.g., CA (Clean Air), CADR (Clean Air Delivery Rate), JEMA (Japan Electrical Manufacturers' Association) standards) may be applied. For example, a differential pressure of a filter replacement time may be determined on the basis of a differential pressure at a time at which a filter of an air purifier designed to cover 49.586777 $m^2$ as a usage area is contaminated with the lapse of time and has the same performance as that of a filter covering 42.975207 $m^2$ as a usage area, through experimentation in a manufacturing process.

In detail, the filtering performance measurement unit 410 measures initial filtering performance of a test target filter and a comparison target filter having performance downgraded more than the test target filter by a predetermined level.

Also, the filtering performance measurement unit 410 periodically measures filtering performance of the test target filter.

When the initial filtering performance of the test target filter is measured by the filtering performance measurement unit 410, the differential pressure measurement unit 420 measures an initial differential pressure of the test target filter at a corresponding timing.

Also, the differential pressure measurement unit 420 measures a differential pressure of the test target filter (i.e., a differential pressure in a replacement time state) at a timing at which filtering performance of the test target filter periodically measured by the filtering performance measurement unit 410 is the same as the initial filtering performance of the comparison target filter having performance downgraded more than the test target filter by a predetermined level.

Here, the differential pressure measurement unit 420 measures a differential pressure of the test target filter in a state in which a flow rate of air introduced to the test target filter is adjusted to a preset flow rate.

The filter replacement time differential pressure determining unit 430 determines a differential pressure (for example, a difference between an initial differential pressure and a differential pressure of a replacement time state) in a filter replacement time regarding the test target filter on the basis of the initial differential pressure measured by the differential pressure measurement unit 420 and the differential pressure of the replacement time state. Accordingly, the air purifier having the test target filter may determine a replacement time of the internal filter on the basis of the differential pressure of the filter replacement time determined by the device 400 for determining filter replacement time differential pressure.

The aforementioned device 400 for determining filter replacement time differential pressure may be included within the air purifier having the test target filter or may be realized as a separate device associated with the air purifier.

FIG. 5 is a flow chart illustrating a method for determining filter replacement time differential pressure for an air purifier according to an exemplary embodiment of the present disclosure. The method for determining filter replacement time differential pressure illustrated in FIG. 5 may be performed by the device for determining filter replacement time differential pressure illustrated in FIG. 4.

Referring to FIG. 5, in operation 501, in a state in which an unused test target filter and a foreign object having a size of 0.3 are inserted into a first experimental chamber having a predetermined size (e.g., 30 $m^3$) and an air volume of a predetermined stage (e.g., 3-stage air volume) is maintained using a fan, the device for determining filter replacement time differential pressure measures initial filtering performance of the test target filter, for example, a time T1 at which the foreign object having the size of 0.3 becomes ⅓ of an initial concentration and measures an initial differential pressure P1 of the test target filter at the time.

Thereafter, in operation 503, in a state in which an unused test target filter having performance downgraded more than the test target filter by a predetermined level and a foreign object having a size of 0.3 are inserted into a second experimental chamber having the same size and an air volume of a predetermined stage (e.g., 3-stage air volume) is maintained using a fan, the device for determining filter replacement time differential pressure measures initial filtering performance of the test target filter, for example, a time T2 at which the foreign object having the size of 0.3 becomes ⅓ of an initial concentration. Here, the test target filter and the comparison target filter may be filters of an air purifier designed to cover 49.586777 $m^2$ and 42.975207 $m^2$ as usage areas, respectively, for example.

Thereafter, in operation 505, a foreign object having a size of 0.3 is periodically inserted into the first experimental chamber, and the device for determining filter replacement time differential pressure periodically measures filtering performance of the test target filter.

The test target filter is contaminated with the lapse of time due to the periodical insertion of the foreign object, and thus, the periodically measured filtering performance of the test target filter is gradually degraded, compared with the initial filtering performance.

Thereafter, in operation 507, the device for determining filter replacement time differential pressure determines a timing at which the periodically measured filtering performance of the test target filter is the same as the initial filtering performance of the comparison target filter, for example, a timing at which the foreign object having a size of 0.3 becomes ⅓ of the initial concentration, is T2, and measures a differential pressure P2 of the replacement time state of the test target filter at the timing.

Thereafter, in operation 509, the device for determining filter replacement time differential pressure determines a differential pressure (for example, a difference between the initial differential pressure P1 and the differential pressure P2 of the replacement time state) of the filter replacement time regarding the test target filter on the basis of the measured differential pressure P2 of the replacement time state and the initial differential pressure P1.

The determined differential pressure of the filter replacement time is previously stored in the memory of the air purifier in which the same filter as the test target filter is applied.

Thereafter, the device for determining filter replacement time differential pressure terminates the algorithm according to an exemplary embodiment of the present disclosure.

In this manner, in the air purifier, the method for determining time to replace a filter thereof, and the device and method for determining a filter replacement time differential pressure therefor, since a filter replacement time is determined on the basis of a flow rate/differential pressure according to usage states of a filter, accurate filter replacement time may be determined, and since alarm is output for user recognition, the user may timely replace the filter for air purification.

While embodiments have been shown and described above, it will be apparent to those skilled in the art that modifications and variations could be made without departing from the scope of the present disclosure as defined by the appended claims.

The invention claimed is:

1. An air purifier comprising:
a memory storing flow rate/differential pressure correlation graphs according to respective filter usage states;
a differential pressure sensor measuring differential pressure as a pressure difference between a front end of the filter and a rear end of the filter; and
a filter replacement time management unit determining a time to replace the filter according to a result of matching a differential pressure of the filter measured by a differential pressure sensor in every preset period and a flow rate of air introduced to the filter at the time of measuring the differential pressure to the flow rate/differential pressure correlation graph according to each usage state;
wherein the memory stores flow rate/differential pressure correlation graphs regarding a plurality of filters, identifies a filter having a graph matched to an initial differential pressure measured by the differential pressure sensor at an initial installation stage and a flow rate of air introduced to the filter at the time of measuring the initial differential pressure on the basis of a flow rate/differential pressure graph of an initial usage stage regarding a plurality of filters, selects a flow rate/differential pressure correlation graph of a replacement time state of the identified filter, and use the selected graph in determining a time to replace the filter.

2. The air purifier of claim 1, wherein the flow rate of air introduced to the filter is any one of a flow rate of air measured by a flow rate sensor at the time of measuring the differential pressure and a flow rate of air previously set according to an air volume stage of the air purifier at the time of measuring the differential pressure.

3. The air purifier of claim 1, wherein when a differential pressure of the filter measured in every preset period and a flow rate of air introduced to the filter at the time of measuring the differential pressure are matched to a flow rate/differential pressure correlation graph of a filter replacement state, the filter replacement time measurement unit determines that a time to replace the filter has arrived.

4. The air purifier of claim 1, further comprising an alarm unit outputting alarm information indicating the time to replace the filter determined b the filter replacement time management unit.

5. A method for determining time to replace a filter of an air purifier, the method comprising:
storing a flow rate/differential pressure correlation graph according to respective filter usage states;
measuring differential pressure of the filter in every preset period; and
determining a time to replace the filter according to a result of matching a differential pressure of the filter measured in every preset period and a flow rate of air introduced to the filter at the time of measuring the differential pressure to the flow rate/differential pressure correlation graph according to each usage state;
further comprising measuring an initial differential pressure of the filter at an initial installation stage; and
identifying a filter having a graph matched to an initial differential pressure and a flow rate of air introduced to the filter at the time of measuring the initial differential pressure on the basis of a flow rate/differential pressure graph of an initial usage state regarding a plurality of filters, and selecting a flow rate/differential pressure correlation graph of a replacement time state of the identified filter.

6. The method of claim 5, wherein the flow rate of air introduced to the filter is any one of a flow rate of air measured by a flow rate sensor at the time of measuring the differential pressure and a flow rate of air previously set according to an air volume stage of the air purifier at the time of measuring the differential pressure.

7. The method of claim 5, wherein in the determining of a time to replace the filter, when a differential pressure of the filter measured in every preset period and a flow rate of air introduced to the filter at the time of measuring the differential pressure are matched to a flow rate/differential pressure correlation graph of a filter replacement state, it is determined that a time to replace the filter has arrived.

8. The method of claim 5, further comprising:
outputting alarm information indicating the time to replace the filter.

* * * * *